US010673238B2

(12) United States Patent
Boone et al.

(10) Patent No.: US 10,673,238 B2
(45) Date of Patent: Jun. 2, 2020

(54) MICRO GRID POWER OPTIMIZATION

(71) Applicant: CANRIG DRILLING TECHNOLOGY LTD., Houston, TX (US)

(72) Inventors: Scott Boone, Houston, TX (US); John Patterson, Cypress, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 418 days.

(21) Appl. No.: 15/424,173

(22) Filed: Feb. 3, 2017

(65) Prior Publication Data

US 2017/0229869 A1    Aug. 10, 2017

Related U.S. Application Data

(60) Provisional application No. 62/291,957, filed on Feb. 5, 2016.

(51) Int. Cl.
*H02J 3/28* (2006.01)
*E21B 41/00* (2006.01)

(52) U.S. Cl.
CPC .............. *H02J 3/28* (2013.01); *E21B 41/00* (2013.01)

(58) Field of Classification Search
CPC ............................. H02J 3/38; Y10T 307/313
See application file for complete search history.

(56) References Cited

U.S. PATENT DOCUMENTS

| 7,860,593 | B2 | 12/2010 | Boone | |
|---|---|---|---|---|
| 8,386,059 | B2 | 2/2013 | Boone | |
| 9,537,315 | B2* | 1/2017 | Kuttel | H02J 3/14 |
| 2007/0175633 | A1* | 8/2007 | Kosmala | E21B 47/0007 |
| | | | | 166/250.15 |
| 2015/0083393 | A1* | 3/2015 | Ferrari | H02J 3/383 |
| | | | | 166/105 |
| 2015/0301546 | A1* | 10/2015 | Hornor | G05B 15/02 |
| | | | | 700/295 |
| 2015/0369017 | A1* | 12/2015 | Hu | E21B 4/04 |
| | | | | 166/244.1 |
| 2016/0265336 | A1* | 9/2016 | Benson | E21B 7/04 |

* cited by examiner

*Primary Examiner* — Rexford N Barnie
*Assistant Examiner* — Elim Ortiz
(74) *Attorney, Agent, or Firm* — Adolph Locklar

(57) ABSTRACT

A micro grid for an oil field is powered by a utility power grid. A micro grid controller is adapted to prevent excessive or unstable power draw on the utility power grid while allowing uninterrupted power supply for drilling rigs in the oil field. The micro grid controller is adapted to control operation of one or more pieces of electrical equipment on the drilling rigs. The micro grid controller may prioritize operation of the electrical equipment based on relative priority of the operations or based on an operating condition of the drilling rig.

16 Claims, 4 Drawing Sheets

MICRO GRID POWER OPTIMIZATION

CROSS-REFERENCE TO RELATED APPLICATIONS

This application is a non-provisional application which claims priority from U.S. provisional application No. 62/291,957, filed Feb. 5, 2016, which is incorporated by reference herein in its entirety.

TECHNICAL FIELD/FIELD OF THE DISCLOSURE

The present disclosure relates generally to power systems and specifically to power systems in an oilfield.

BACKGROUND OF THE DISCLOSURE

Drilling rigs include many electrically powered systems. Due to the nature of drilling activities, the electrical power draw for drilling rigs may vary considerably and rapidly, particularly with respect to drilling operations. Drilling rigs in an oil field traditionally utilize one or more generators positioned to provide power to the drilling rig. In an oil field that may include multiple drilling rigs, providing the multiple generators with fuel may not only incur substantial costs in transport, but may also require additional and otherwise unnecessary infrastructure to allow fuel transportation to each drilling rig.

SUMMARY

The present disclosure provides for a micro grid for an oil field. The micro grid may include a power supply line. The power supply line may be coupled to a utility power grid. The micro grid may include a plurality of drilling rigs. Each drilling rig may be electrically coupled to the power supply line. Each drilling rig may include one or more pieces of electrical equipment. Each drilling rig may include a rig controller. The rig controller may be adapted to control the electrical equipment and monitor the electrical power draw of each piece of electrical equipment. The micro grid may include a micro grid controller. The micro grid controller may be in communication with each rig controller and may be adapted to receive from each rig controller one or more operational parameters relating to the electrical power draw of the one or more pieces of electrical equipment. The micro grid controller may be adapted to control the rig controllers at least partially in response to the power draw of the micro grid on the power supply line.

The present disclosure also provides for a method. The method may include providing a power supply line to an oil field. The oil field may include a plurality of drilling rigs. Each drilling rig may include one or more pieces of electrical equipment and a rig controller. The rig controller may be adapted to control the electrical equipment and monitor the electrical power draw of each piece of electrical equipment. The method may include coupling the plurality of drilling rigs to a power substation. The power substation may include a micro grid controller. The micro grid controller may be in communication with each rig controller. The method may include receiving, by the micro grid controller, one or more operational parameters relating to the electrical power draw of at least one piece of electrical equipment from a corresponding rig controller. The method may include transmitting, by the micro grid controller, an instruction to at least one rig controller to modify the power draw of the at least one piece of electrical equipment at least partially in response to the power draw on the power supply line. The method may include modifying the power draw of the at least one piece of electrical equipment by the corresponding rig controller in response to the instruction.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
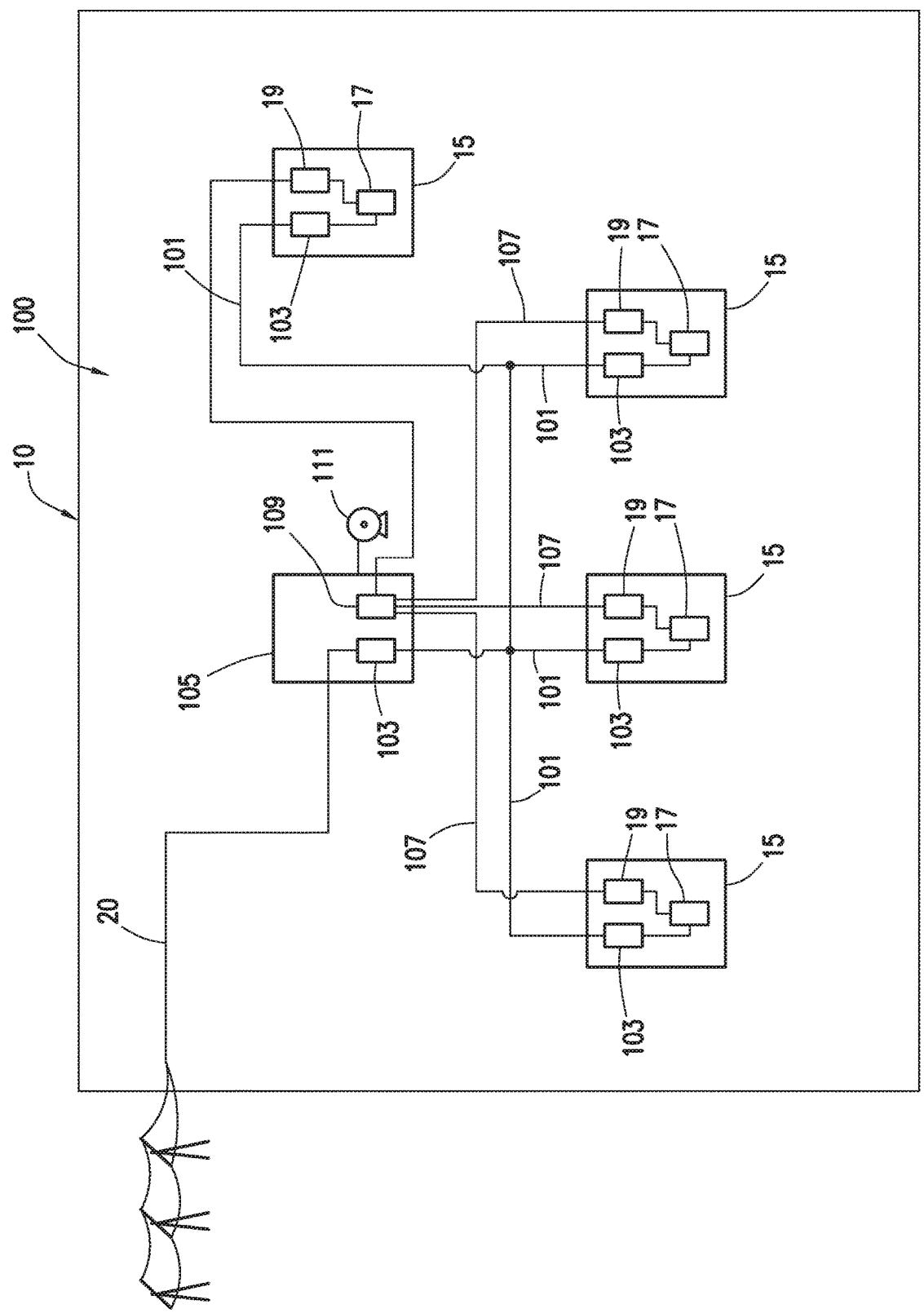
FIG. 1 depicts an oil field micro grid consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As depicted in FIG. 1, oil field 10 may include one or more drilling rigs 15. Each drilling rig 15 may include electrical equipment 17 including, but not limited to, drawworks, mud pumps, hydraulic pumps, top drives, winches, hydraulic pumps, and lighting. In some embodiments, each drilling rig 15 may include rig controller 19 adapted to control the operating conditions of some or all of electrical equipment 17, monitor the operation of some or all of electrical equipment 17 of drilling rig 15, receive instructions from control station 22, receive instructions from micro grid controller 109, and communicate data regarding electrical equipment 17. Rig controller 19 may include a user interface, a microprocessor, and memory. The memory of rig controller 19 may include a non-transitory computer readable medium for storage of instructions for control and monitoring of electrical equipment 17 of drilling rig 15.

In some embodiments, electrical power may be supplied to oil field 10 by an external power grid, depicted in FIG. 1 as power line 20. Power supply line 20 may, as understood in the art, receive power from one or more power plants. Power supply line 20 may serve to electrically couple oil field 10 to a local utility power grid to supply electrical power to oil field 10 through micro grid 100.

In some embodiments of the present disclosure, micro grid 100 may be defined as the local electrical power supply and electrical distribution system for oil field 10. Micro grid 100 may, in some embodiments, include one or more power lines 101. Power lines 101 may electrically couple each drilling rig 15 to power supply line 20. In some embodiments, micro grid 100 may further include signal conditioning equipment 103. Signal conditioning equipment 103 may be located at each drilling rig 15, at a centralized power substation 105, or both. In some embodiments, signal conditioning equipment 103 may include one or more transformers, filters, or energy storage systems. In some embodiments, micro grid 100 may further include data communication lines 107. Data communication lines 107 may transmit data between one or more rig controllers 19 of drilling rigs 15 and micro grid controller 109 of power substation 105. In certain embodiments, data communications lines 107 may transmit data between rig controllers 19. One having ordinary skill in the art with the benefit of this disclosure will understand that communication lines 107 may be hardwired, wireless, cellular, satellite, or any other communication network that may transfer data among rig controllers 19 and power substation 105. In some embodiments, micro grid 100 may include one or more generators 111 positioned to provide power to micro grid 100 as discussed below.

Figure 2:
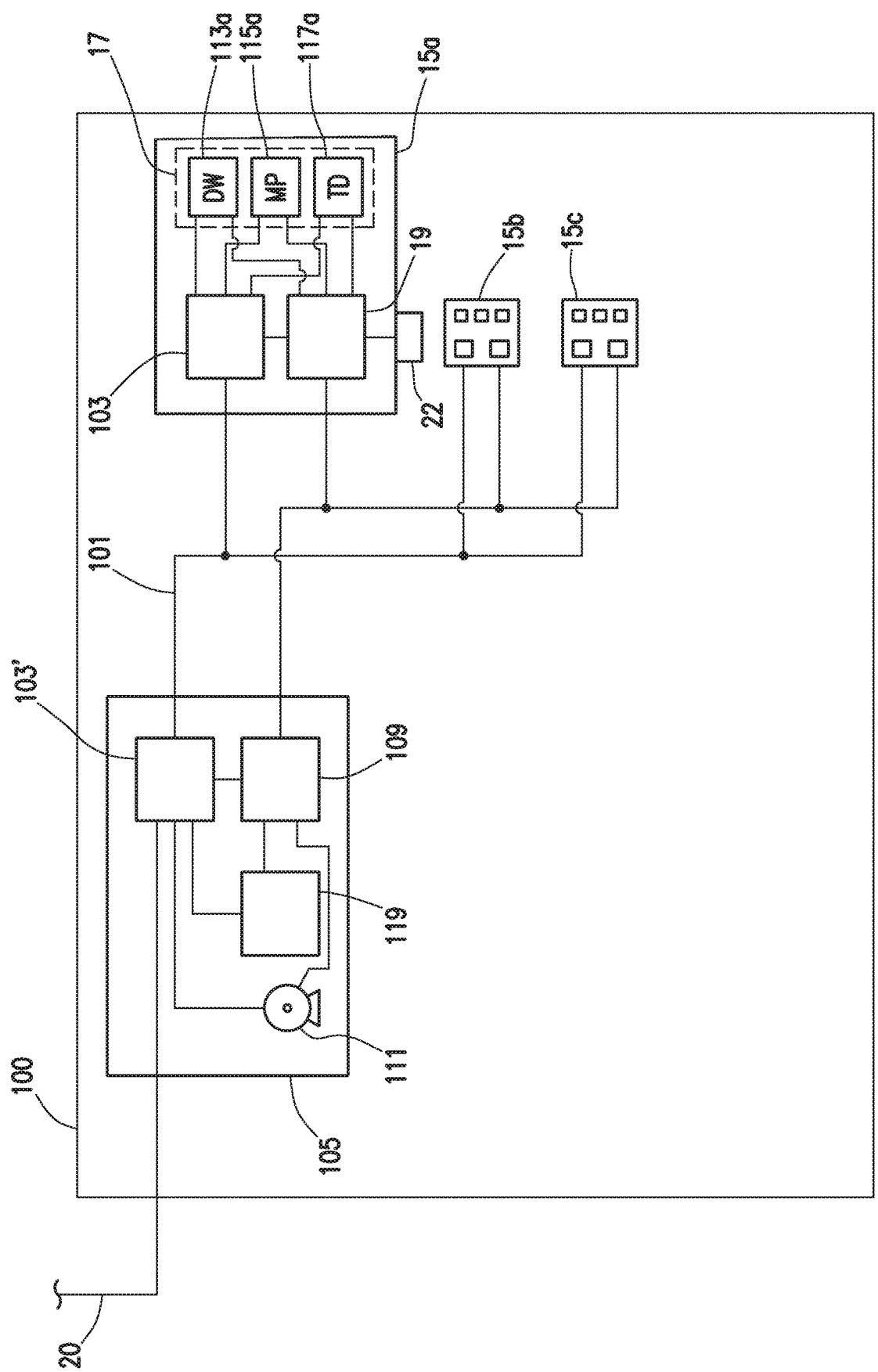
FIG. 2 depicts a flow diagram of an oil field micro grid consistent with at least one embodiment of the present disclosure.

As depicted in FIG. 2, each drilling rig 15a-c may include electrical equipment 17. FIG. 2 depicts drilling rig 15a as including drawworks 113a, mud pump 115a, and top drive 117a. One having ordinary skill in the art with the benefit of this disclosure will understand that drilling rigs 15b and 15c may include similar equipment and that FIG. 2 depicts a simplified arrangement of the drilling rigs for the sake of clarity. Additionally, one having ordinary skill in the art with the benefit of this disclosure will understand that drilling rigs 15a-c may include additional electrical equipment 17 without deviating from the scope of this disclosure. In some embodiments, electrical equipment 17 may be controlled by rig controller 19. Rig controller 19 may, as understood in the art, be electrically coupled to one or more control stations 22 allowing one or more operators to operate the electrical equipment 17 during operations of drill rig 15a-c. Control station 22 may include any equipment to control electrical equipment 17, either manually or through such computer controls as a graphical user interface (GUI). Additionally, electrical equipment 17 may be coupled to power lines 101 through signal conditioning equipment 103. Signal conditioning equipment 103 may include, for example and without limitation, one or more of transformers, capacitors, rectifiers, inverters, variable frequency drives, etc. adapted to provide power to electrical equipment 17 as required for a desired operation of drilling rig 15a-c. In some embodiments, signal conditioning equipment 103 may be controlled by rig controller 19 based, for example and without limitation, on a desired operation of drilling rig 15a-c or based on operating conditions of drilling rig 15a-c.

In some embodiments, micro grid 100 may further include power substation 105. Power substation 105 may include micro grid controller 109. Micro grid controller 109 may be in data communication with rig controllers 19 of each drilling rig 15a-c through data communications lines 107. Micro grid controller may be adapted monitor and control the power draw on power line 20, receive data communications from rig controllers 19, and communicate instructions regarding electrical equipment 17 or power draw to rig controllers 19. Micro grid controller 109 may include a user interface, a microprocessor, and memory. The memory of micro grid controller 109 may include a non-transitory computer readable medium for storage of instructions for control and monitoring of rig controllers.

Power substation 105 may likewise include substation signal conditioning equipment 103'. In some embodiments, substation signal conditioning equipment 103' may include, for example and without limitation, one or more of transformers, capacitors, rectifiers, inverters, variable frequency drives, etc. adapted to provide power to drilling rigs 15a-c, power substation 105, or to any other electrical equipment used in the oilfield.

In some embodiments, substation signal conditioning equipment 103' may also be electrically coupled to one or more generators 111. Generators 111 may be used to supplement power supplied by power supply line 20 when, for example and without limitation, the total power draw of micro grid 100 exceeds a predetermined threshold power draw on power supply line 20. In some embodiments, the threshold power draw may be determined at least in part by the supply capacity of power supply line 20. In some embodiments, the threshold power draw may be determined at least in part with respect to fees or other limitations on the use of power supplied by power supply line 20. Generators 111 may be controlled by micro grid controller 109. In some embodiments, micro grid controller 109 may be adapted to control the operational state of generators 111 and may be adapted to control the power output thereof.

In some embodiments, substation signal conditioning equipment 103' may be electrically coupled to one or more energy storage systems 119. Energy storage systems 119 may store energy provided by power supply line 20, generators 111, and/or power regenerated by operation of electrical equipment 17 of drilling rigs 15a-c. In some embodiments, energy storage systems 119 may utilize any energy storage apparatus including without limitation one or more of capacitive energy storage banks, electromechanical energy storage systems, or other energy storage system. In some embodiments, energy stored in energy storage systems 119 may be used to supplement power supplied by power supply line 20 when, for example and without limitation, the total power draw of micro grid 100 exceeds a threshold power draw on power supply line 20. In some embodiments, energy storage systems 119 may reduce undesired variations in power draw on power supply line 20. For example, while power draw on micro grid 100 is low, electrical power may be provided to energy storage systems 119 to increase stored energy. Likewise, an increase in power draw on micro grid 100 caused, for example, by an operation of electrical equipment 17 on a drilling rig 15a-c, may be supplied in part by energy stored in energy storage systems 119 to, for example and without limitation, prevent rapid increases in power draw on power supply line 20. Furthermore, during start-up of some electrical equipment 17 on drilling rigs 15a-c, transient high power draw may be very high and may exceed the supply capacity of power supply lines 20. By providing power from energy storage systems 119, power draw on power supply lines 20 may be, for example, smoothed or may remain below the supply capacity thereof.

In some embodiments, energy stored in energy storage systems 119 and/or power regenerated by operation of electrical equipment 17 of drilling rigs 15a-c may, when not needed by micro grid 100, be returned to the utility power grid for example, through sales to a utility company power grid through power supply lines 20 as understood in the art.

As described above, rig controllers 19 may, for example and without limitation, provide information to micro grid controller 109 regarding the status of the respective drilling rig 15a-c. In some embodiments, information provided to micro grid controller 109 may include, for example and without limitation, rig power draw, power draw of each piece of electrical equipment 17, the operation or operations being currently performed by drilling rig 15a-c, and operator inputs and other operational parameters for each piece of electrical equipment 17. As understood in the art, operator inputs may include, for example and without limitation, the speed at which a piece of equipment such as drawworks 113a, mud pump 115a, or top drive 117a is operated. For instance, when the top drive of drilling rig 15 is being operated, rig controller 19 may measure the amperage draw for the top drive, the overall amperage draw for all electrical equipment 17 on drilling rig 15, and the operation being performed by the top drive.

In some embodiments, micro grid controller 109 may receive the information from each drilling rig 15a-c and control each rig controller by outputting one or more instructions to each rig controller 19 for drilling rigs 15a-c. For example, in some embodiments, micro grid controller 109 may be adapted to signal rig controller 19a to lower the power supplied to one or more pieces of electrical equipment 17. In some embodiments, the power supplied may be lowered by, for example and without limitation, removing power supplied to unnecessary auxiliary equipment or modifying operator inputs for electrical equipment 17.

In some embodiments, micro grid controller 109 may be in communication with the utility power grid used to source electrical power over power supply lines 20. As understood in the art, a utility power grid company may impose fees on one or more of excessive power draw, inconsistent power draw, or power spikes which may cause disruption to other users of the power grid. In some embodiments, micro grid controller 109 may be adapted to communicate anticipated increases in power draw to the utility power grid to, for example, allow the utility power grid to preemptively increase power generation to mitigate additional draw from micro grid 100.

Figure 3A:
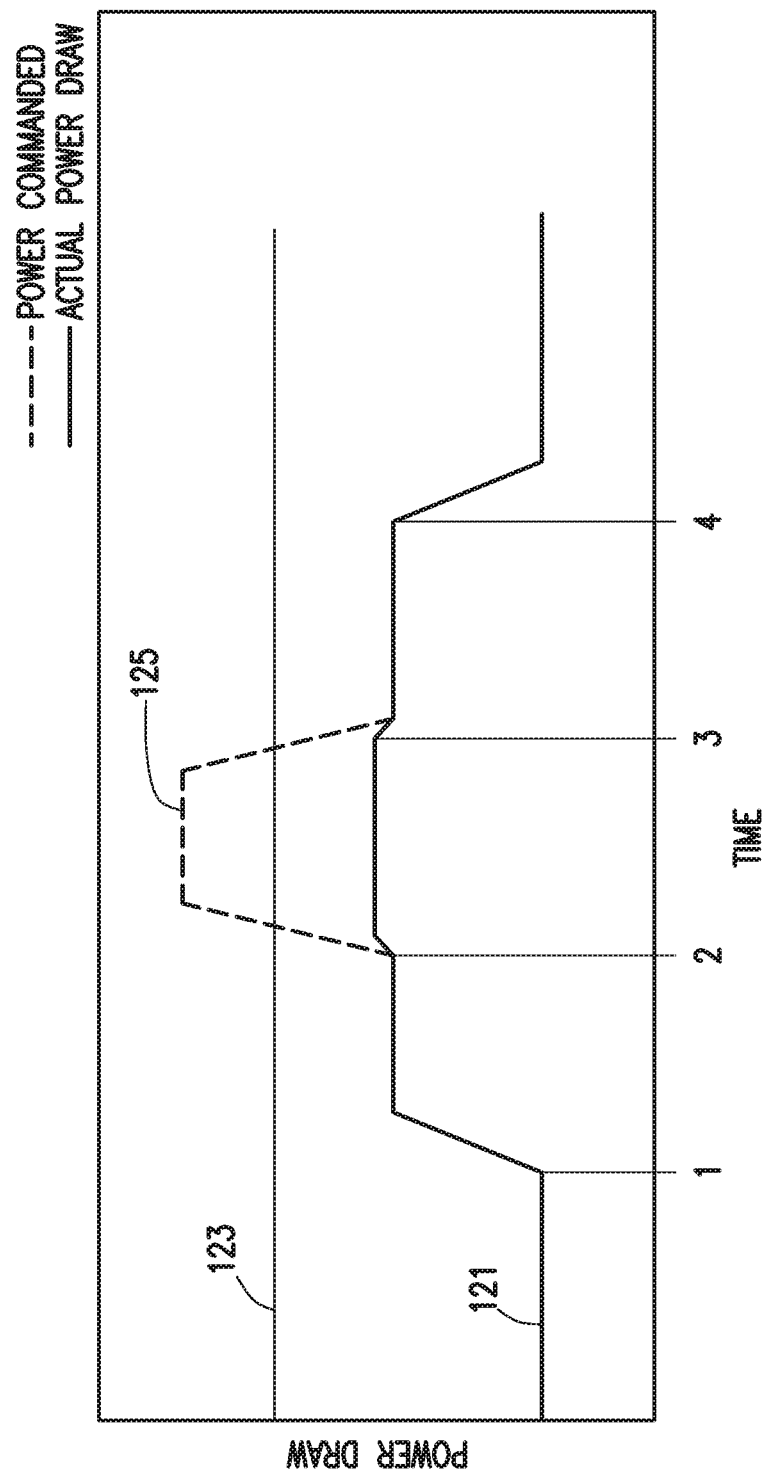
FIGS. 3A-3C depict an operation consistent with at least one embodiment of the present disclosure.
Figure 3B:
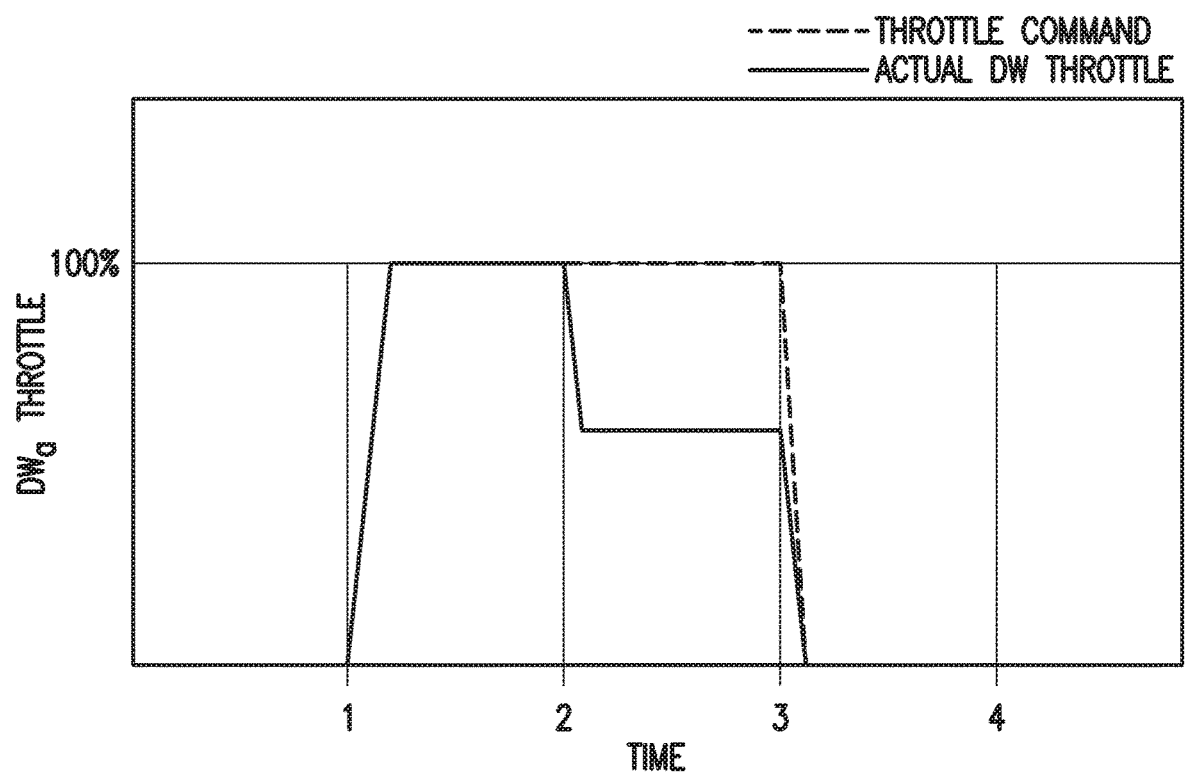
Figure 3C:
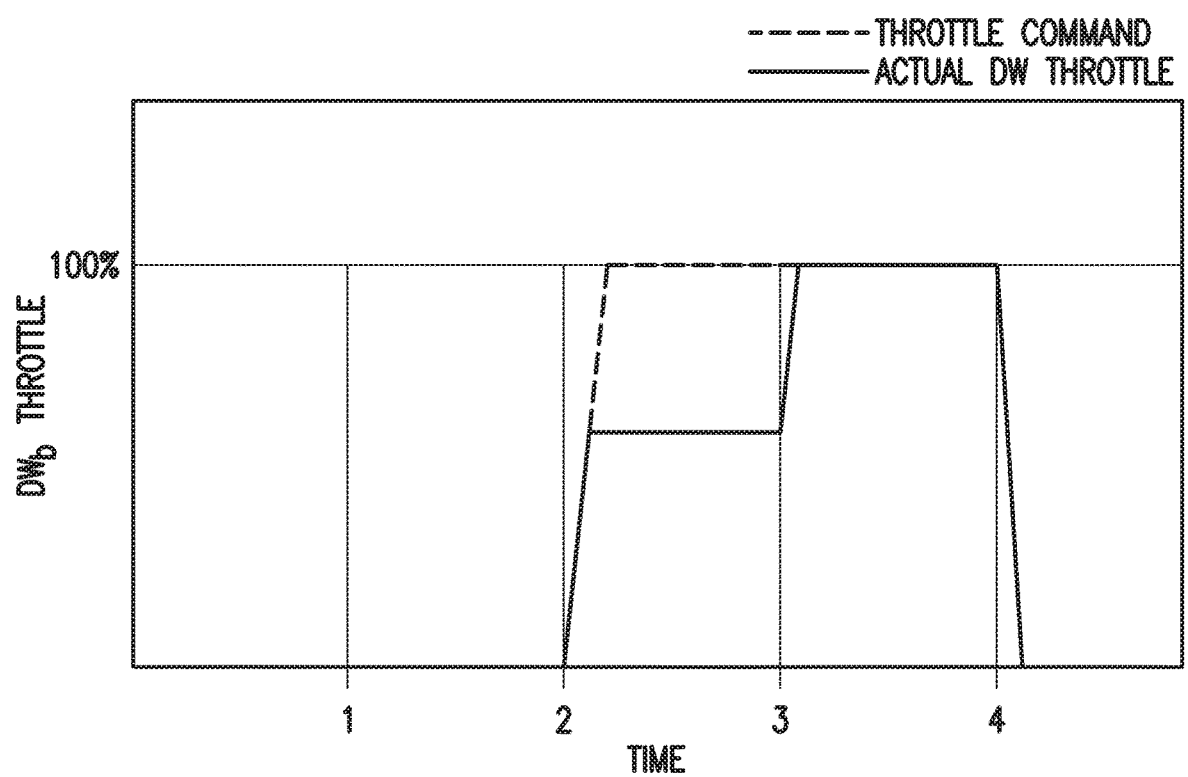

As a nonlimiting example, FIGS. 3A-C depict a scenario in which drilling rigs 15a and 15b simultaneously operate at high power draw, such as operating a drawworks during a tripping out operation. As depicted in FIG. 3A, at time 0, micro grid power draw 121 is at a nominal low. At time 1, as depicted in FIG. 3B, an operator at drilling rig 15a commands drawworks a to operate at 100% throttle (or torque command). Micro grid controller 109 may receive the command and determine that current power draw and power supplied on micro grid 100 may allow for this operation without surpassing power capacity 123. Thus, drawworks a begins to operate at 100% throttle. Correspondingly, micro grid power draw 121 increases.

At time 2, as depicted in FIG. 3C, an operator at drilling rig 15b commands drawworks b to operate at 100% throttle. Micro grid controller 109 may receive the command and determine that the current power draw and power supplied to micro grid 100 is not sufficient to allow drawworks b to operate at 100% throttle without surpassing power capacity 123 as depicted by power commanded 125.

In some instances, micro grid controller 109 may engage generators 111 or draw power from energy storage systems 119 as previously discussed to increase power capacity 123. In some instances, micro grid controller 109 may request additional power supply to micro grid 100 from the utility power grid through power supply lines 20. In some instances, micro grid controller 109 may prevent operation of drawworks b or halt the operation of drawworks a. In some instances, as depicted in FIGS. 3B, 3C, micro grid controller 109 may communicate with the rig controllers 19 to reduce the speed of drawworks a and drawworks b to a lower throttle independent of or in modification of the operator commanded throttle. As seen in FIG. 3A, micro grid power draw 121 may thus remain relatively stable or remain under power capacity 123, while allowing both drawworks a and drawworks b to operate, albeit at a decreased speed. One having ordinary skill in the art with the benefit of this disclosure will understand that any of the above operations may be carried out by micro grid controller 109 simultaneously to prevent micro grid power draw 121 from exceeding power capacity 123.

At time 3, as depicted in FIG. 3B, the operator may command drawworks a to stop. Micro grid controller 109 may receive the command and determine that with drawworks a consuming reduced power, sufficient power is available to drawworks b to operate at a higher throttle. Thus, micro grid controller 109 may command drawworks b to operate at the desired throttle input. Additionally, if engaged, generators 111 may be disengaged or their output reduced.

One having ordinary skill in the art with the benefit of this disclosure will understand that although described in terms of a tripping out operation utilizing drawworks, the above described operation could be used with any piece of drilling equipment on each drilling rig for any operation.

In some embodiments, in order to prevent micro grid power draw 121 from exceeding power capacity 123, micro grid controller 109 may communicate instructions based on operational considerations in addition to the expected power draw. For example, operational considerations may include the relative priority of a requested operation, emergency situations, or feedback from the individual pieces of electrical equipment 17. One having ordinary skill in the art with the benefit of this disclosure will understand that the prioritization may be selectively configurable or reconfigurable.

For example, as understood in the art, certain operations are more time sensitive than others. As an example, drilling rig 15a may be utilizing one or more winches or drawworks to move equipment on the drill floor. Drilling rig 15b may be using its drawworks to lift a drilling string off well bottom. As understood in the art, a delay in coming off bottom may result in a stuck drill string, greatly increasing the difficulty of continuing drilling operations, whereas a delay in moving a piece of equipment may be noncritical depending on the situation. Thus, micro grid controller 109 may prioritize the operation of the drawworks for drilling rig 15b over the operation of that of drilling rig 15a to, for example, prevent delays for drilling rig 15b.

As another example, in an emergency situation, an otherwise noncritical or low priority operation may increase in importance. For example, if drilling rig 15a is in an emergency situation, such as in the case of a blowout, fire, or while handling a kick, the otherwise noncritical action of moving equipment or operation of otherwise low priority equipment may take precedence over an otherwise high priority operation such as coming off bottom at drilling rig 15b. In such a scenario, micro grid controller 109 may prioritize the operations of drilling rig 15a over those of drilling rig 15b while emergency remediation is in progress.

In some embodiments, micro grid controller 109 may be configured to prioritize operations or adjust the energy stored in energy storage systems 119 or generated by generators 111 in response to a predetermined schedule or prognosis for a well. As understood in the art, the drilling of a well is generally planned in advance. By anticipating the power draw of micro grid 100 based on the anticipated operations to be undertaken, the overall power draw from power supply lines 20 may be stabilized by preemptively storing additional power with energy storage systems 119 or utilizing generators 111. Likewise, when few operations are scheduled, generators 111 and energy storage systems 119 may be disengaged to, for example and without limitation, reduce energy consumption and component wear. In some embodiments, micro grid 100 as described herein may utilize a Well Prog system as described in U.S. Pat. Nos. 7,860,593 and 8,386,059, the entirety of which is hereby incorporated by reference.

Additionally, energy stored in energy storage systems 119 may, as previously discussed, be sold back to the utility power grid company. As understood in the art, as electrical demand fluctuates throughout the day, the price of electrical power sold to the utility power grid may vary. Micro grid controller 109 may thus supply power to the utility power grid to optimize or maximize the income from the sale of the power.

In some embodiments, rig controllers 19 may be included as part of a Motor Control Center (MCC) controller of a drilling rig. In some embodiments, rig controller 19 may include or be operatively coupled to a VFD and/or controllable transformer. In some embodiments, the VFD or controllable transformer may be retrofittable onto an existing rig.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A micro grid for an oil field comprising:
    a power supply line, the power supply line electrically coupled to a utility power grid;
    a plurality of drilling rigs, each drilling rig electrically coupled to the power supply line and including:
        one or more pieces of electrical equipment; and
        a rig controller, the rig controller adapted to control the electrical equipment and monitor the electrical power draw of each piece of electrical equipment; and
    a micro grid controller, the micro grid controller in communication with each rig controller and adapted to receive from each rig controller one or more operational parameters relating to the electrical power draw of the one or more pieces of electrical equipment, the micro grid controller adapted to control the rig controllers at least partially in response to the power draw of the micro grid on the power supply line.

2. The micro grid of claim 1, wherein the micro grid controller is located at a power substation, the power substation adapted to electrically couple power from the power supply line to the drilling rigs through one or more power lines.

3. The micro grid of claim 1, further comprising signal conditioning equipment positioned between the power supply line and the electrical equipment.

4. The micro grid of claim 1, further comprising an energy storage system, the energy storage system adapted to store energy from one or more of the power supply line or a piece of electrical equipment, the energy storage system controllable by the micro grid controller and adapted to provide stored energy to one or more of the utility power grid or at least one piece of electrical equipment.

5. The micro grid of claim 4, wherein the micro grid controller is adapted to provide power to the utility power grid to maximize a sale price of the power provided.

6. The micro grid of claim 1, wherein each rig controller is in communication with the micro grid controller by one or more of a hardwired, wireless, cellular, or satellite communication network.

7. The micro grid of claim 1, further comprising a generator controlled by the micro grid controller, the generator adapted to supply power to at least one piece of electrical equipment.

8. The micro grid of claim 1, wherein a rig controller of the plurality of rig controllers is adapted to transmit an operator command for a piece of electrical equipment to the micro grid controller.

9. The micro grid of claim 8, wherein the micro grid controller is adapted to modify the operator command based at least in part on a determined available power capacity of the micro grid.

10. The micro grid of claim 8, wherein a second rig controller of the plurality of rig controllers is adapted to transmit a second operator command for a second piece of electrical equipment to the micro grid controller.

11. The micro grid of claim 10, wherein the micro grid controller is adapted to modify one or more of the first operator command and the second operator commands based at least in part on a determined available power capacity of the micro grid.

12. The micro grid of claim 10, wherein the micro grid controller is adapted to modify one or more of the first operator command and the second operator commands based at least in part on a preselected prioritization of an operation corresponding to the first operator command and an operation corresponding to the second operator command.

13. The micro grid of claim 10, wherein the micro grid controller is adapted to modify one or more of the first operator command and the second operator commands based at least in part on an operating condition of a first drilling rig corresponding with the first rig controller or a second drilling rig corresponding with the second rig controller.

14. The micro grid of claim 8, wherein the operator command corresponds to a throttle input or torque loading input of the piece of electrical equipment.

15. The micro grid of claim 1, wherein each drilling rig further comprises at least one of a transformer or variable frequency drive controlled by the rig controller.

16. A method comprising:
    providing a power supply line to an oil field, the oil field including a plurality of drilling rigs, each drilling rig including:
        one or more pieces of electrical equipment; and
        a rig controller, the rig controller adapted to control the electrical equipment and monitor the electrical power draw of each piece of electrical equipment;
    coupling the plurality of drilling rigs to a power substation, the power substation including a micro grid controller, the micro grid controller in communication with each rig controller;
    receiving, by the micro grid controller, one or more operational parameters relating to the electrical power draw of at least one piece of electrical equipment from a corresponding rig controller;
    transmitting, by the micro grid controller, an instruction to at least one rig controller to modify the power draw of the at least one piece of electrical equipment at least partially in response to the power draw on the power supply line; and modifying the power draw of the at least one piece of electrical equipment by the corresponding rig controller in response to the instruction.

\* \* \* \* \*